United States Patent

[11] 3,587,748

[72] Inventor William I. Kerr
Laurel, Mich.
[21] Appl. No. 1,417
[22] Filed Jan. 8, 1970
[45] Patented June 28, 1971
[73] Assignee Tri-state Oil Tool Industries, Inc.
Bossier City, Parish, La.

[54] METHOD OF RETRIEVING A FISH FROM A WELL BORE
4 Claims, 6 Drawing Figs.
[52] U.S. Cl. ........................................................ 166/301
[51] Int. Cl. .................................................. E21b 29/00,
E21b 31/00
[50] Field of Search ............................................ 166/301,
99; 175/41

[56] References Cited
UNITED STATES PATENTS
2,495,352 1/1950 Smith ............................ 166/277
3,220,495 11/1965 McLaren, Jr. ................. 166/277X
3,242,985 3/1966 North ............................ 175/41X Primary Examiner—Stephen J. Novosad
Attorneys—J. Vincent Martin, Joe E. Edwards and Jack R. Springgate ABSTRACT: A method of retrieving a fish from a well bore where the upper end of the fish is outside the normal well bore and cannot be caught by the usual fishing tools wherein such method includes the steps of cutting a notch in the side of the uppermost portion of the fish within the normal well bore and thereafter locating a cutter on such notch to cut through the fish so that a retrieving tool engages the fish and retrieves the same when the string with the cutter and retrieving tool is pulled.

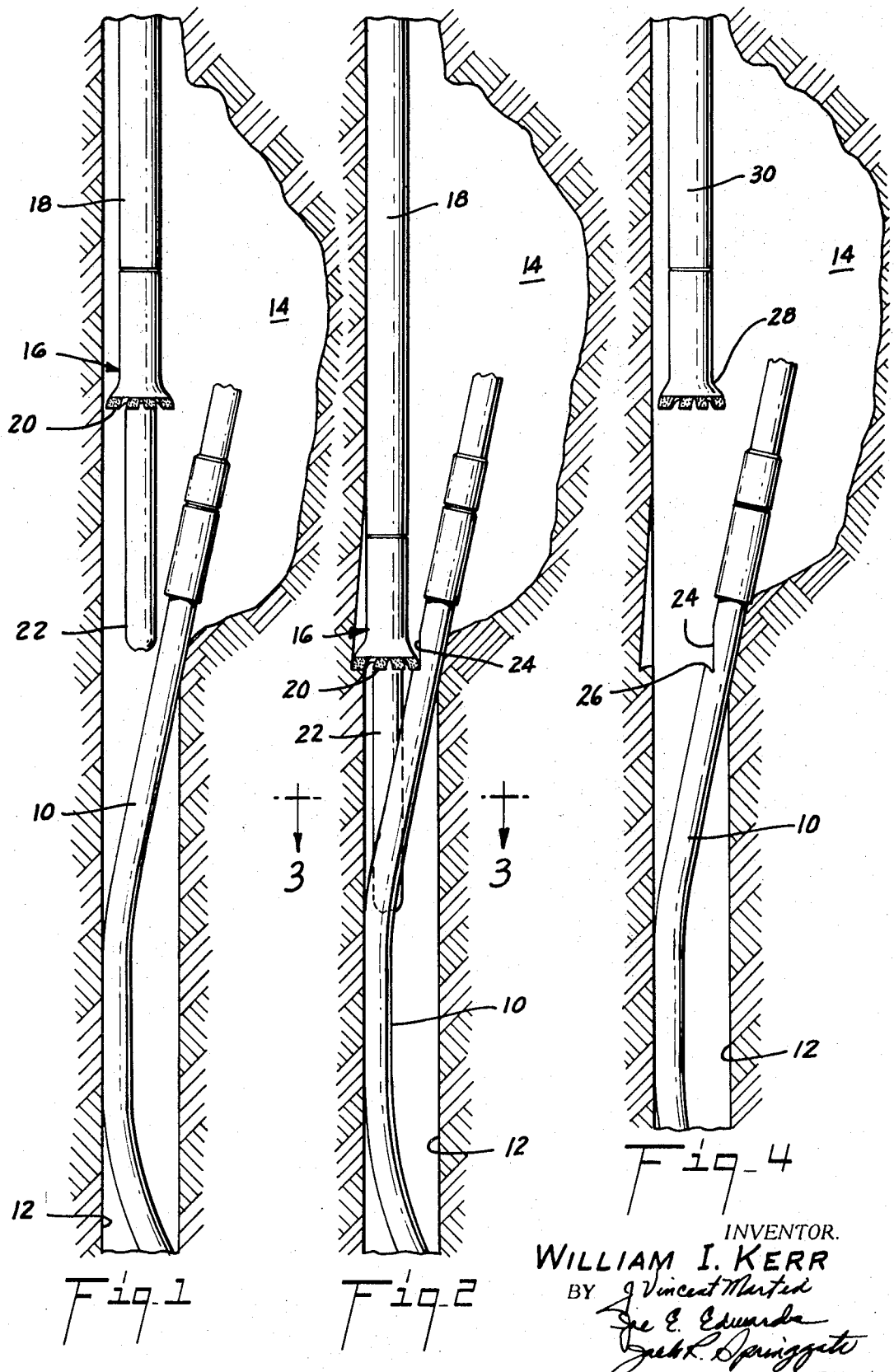

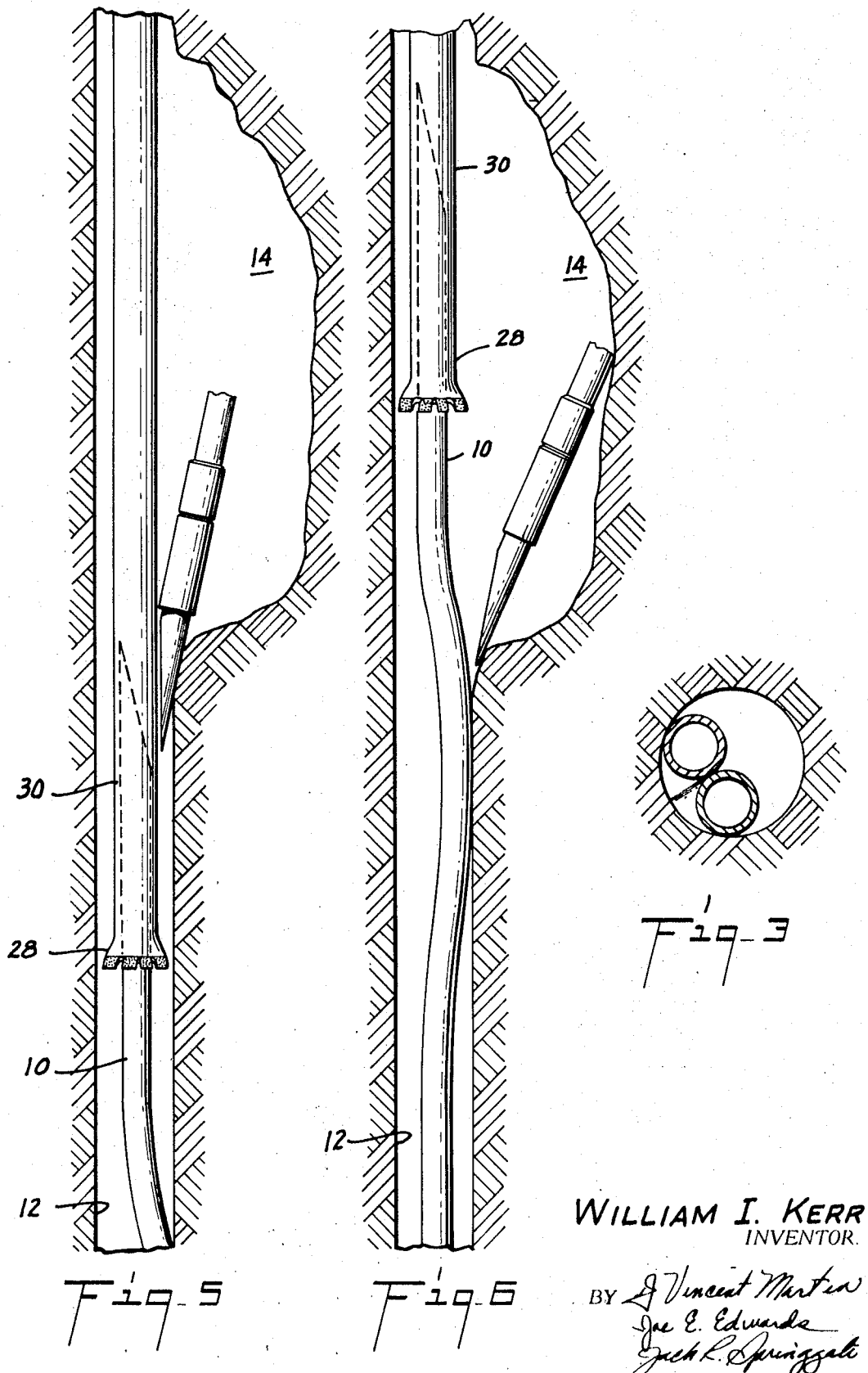

METHOD OF RETRIEVING A FISH FROM A WELL BORE

SUMMARY

The present invention relates to an improved method of retrieving a fish from a well bore where the upper end of the fish extends outside the normal well bore and cannot be reached by the usual retrieving tools.

An object of the present invention is to provide an improved method of retrieving a fish from a well bore which can recover the major portion of the fish with a minimum effort when the upper end of the fish is inaccessible to fishing tools.

Another object of the present invention is to provide an improved method of retrieving a fish from a well bore which can be performed with standard drilling and fishing tools.

A further object of the present invention is to provide an improved method of retrieving a fish from a well bore without damaging or having to abandon the bore previously drilled below the upper end of the fish.

The improved method of the present invention for retrieving a fish from a well bore includes the steps of cutting a notch in the fish without sidetracking the well bore, thereafter cutting through the top portion of the fish to allow it to be caught and retrieved by an overshot retrieving tool.

BRIEF DESCRIPTION OF THE DRAWINGS

These and other objects and advantages of the present invention are hereinafter set forth and explained with reference to the drawings wherein:

FIG. 1 is a sectional view of a well bore with a fish stuck therein and where the upper end of the fish is in an extended area of the well bore outside its normal walls and shows the lowering of a pilot type cutting tool.

FIG. 2 is a sectional view of the well bore with the cutting tool notching the upper end of the fish within the well bore.

FIG. 3 is a sectional view transversely of the well bore taken along line 3-3 in FIG. 2.

FIG. 4 is a sectional view of the well bore illustrating the lowering of the string with a cutter and retrieving tool thereon.

FIG. 5 is a sectional view of the well bore illustrating the downward movement of the string after the severing of the fish to allow catching of the fish in the overshot retrieving tool.

FIG. 6 is another sectional view of the well bore illustrating the removal of the string and the fish from the well bore.

DESCRIPTION OF THE PREFERRED EMBODIMENT

As shown in FIG. 1, the fish 10 which is a portion of the drill string which has broken is stuck in the well bore 12. The upper end of the fish 10 is hidden from the usual fishing tools in the extended portion 14 of the well bore 12. This extended portion 14 may be the result of a cave-in a ledge, keyseat or other discontinuity so that the usual fishing tools which are designed to catch or surround the upper end of a fish cannot locate the upper end and therefore, are not able to recover the fish 10 from the well bore 12.

If a cutting tool were lowered into the well bore 12 in an attempt to cut the upper end of the fish in the well bore, the fish would act as a whipstock to divert the direction of the cutting against the side of the well bore rather than cutting the fish. By securing the pilot cutter or mill 16 to the drill string 18 and lowering the drill string until the cutter surfaces 20 engage the fish, the depending pilot tube 22 projects downwardly in the well bore 12 alongside the fish 10. The tube 22 has a diameter so that when it is beside the fish they almost completely fill the well bore. By rotating the string 18, the cutter 16 cuts the notch 24 in the side of the fish 10. Generally it is preferred that the cutter 16 have a concave lower surface so that the notch 24 is cut to have a shoulder or lip 26.

When the notch 24 is cut sufficiently deep to assure that the subsequent steps may be performed, the string 18 is pulled and the pilot tool 16 is removed and the cutter or mill 28 and the overshot retrieving tool 30 are positioned on the lower end of the string. With the string 18 having the cutter 28 and retriever 30 thereon, it is lowered into the well bore 12 as shown in FIG. 4. The cutter 28 has a concave lower surface to engage in the notch 24. As the string 18 is rotated, the cutter 28 completes the cut through the fish 10. With the fish severed, the string 18 is lowered so that the severed upper end of the fish 10 within the well bore 12 is engaged within the retrieving tool 30 as shown in FIG. 5.

With the fish 10 engaged by the retrieving tool 30, the string 18 is withdrawn or pulled from the well bore 12 and the major portion of the fish is pulled along with it as shown in FIG. 6. The small portion of the fish 10 within the enlargement 14 will either remain in the enlargement so that it does not interfere with further operations within well bore 12 or it will fall to the bottom of the well bore 12 where it may be retrieved by conventional fishing methods.

The notching of the fish 10 as best shown in FIG. 2 is done with a minimum of undercutting of the well bore opposite the fish 10. The reason for this is the support given by the pilot tube 22 against the wall of the well bore below the cutting surface 20 of the cutter 16 and the support provided by the pilot tube 22 to prevent movement of the fish 10 during the milling of the notch 24. The lip 26 assures that the mill 28 engages the fish at the notch 24 so that the fish 10 is cut by the mill 28 rather than the formation. Thus, the lip 26 forms a mating surface for retaining the mill 28 in cutting position on the fish 10 during the severing step.

From this it can be seen that the improved method of the present invention is suitable for recovering or retrieving a fish which is stuck in a well bore with its upper end obscured from normal fishing operations by being displaced outside the normal sides or walls of the well bore. The retrieval is simple, quick, done with standard available tools and without damaging or redrilling any substantial portion of the well bore.

I claim:

1. The method of retrieving a fish from a well bore wherein the upper end of the fish is outside the bore hole including the steps of:
    lowering a cutter having a pilot depending tube therefrom on a string into the well bore to a position at which said cutter engages said fish and said pilot is in the bore hole adjacent the fish;
    rotating the string to cut a notch in the side of the fish;
    pulling the string;
    lowering a second string having a second cutter and a fish retrieving tool thereon in the well bore to a position with said second cutter engaging the notch on said fish;
    rotating said second string to cut through said fish, lowering the string to engage the upper end of the portion of said fish below said cut with said retrieving tool; and
    pulling the second string with the fish engaged therewith from the well bore to retrieve said fish.

2. The method of retrieving a fish from a well bore wherein the upper end of the fish is in an area recessed outwardly from the well bore, including the steps of:
    running a pilot cutter on a string into the well bore to place the cutting surfaces of said cutter in engagement with said fish;
    rotating said string to cut a notch in the side of said fish;
    pulling said string from said well bore;
    running a cutter and fish retriever into said well bore to position said cutter in said notch on said fish;
    rotating said string to cut said fish;
    lowering said string to allow said retriever to catch the cut upper end of said fish; and
    pulling said string to retrieve the fish from said well bore.

3. The method according to claim 2, wherein:
    said notch cutting forms a notch with a lip for engagement to retain the cutter in cutting position against said fish during said fish cutting step.

4. The method of retrieving a fish from a well bore wherein the upper end of the fish is hidden by a discontinuity in the well bore including the steps of:
    cutting a notch with a first cutter in the upper portion of said fish while holding said fish against movement and holding the cutter against substantial cutting into the walls of the well bore;
removing the first cutter;
severing said fish with a second cutter at said notch with said notch locating said second cutter and assuring severing of said fish without substantial cutting into the walls of the well bore; and
retrieving the severed portion of said fish from said well bore.